(12) United States Patent
Xu (10) Patent No.: US 9,719,852 B2
(45) Date of Patent: Aug. 1, 2017

(54) SYSTEM AND METHOD FOR COMPENSATING LIGHT SOURCE DRIFT AT DIFFERENT WAVELENGTHS WITH A SINGLE REFERENCE CHANNEL IN A LIGHT MEASURING DEVICE

(71) Applicant: DATACOLOR HOLDING AG, Lucerne (CH)

(72) Inventor: Zhiling Xu, West Windsor, NJ (US)

(73) Assignee: DATACOLOR HOLDING AG, Lucerne (CH)

( * ) Notice: Subject to any disclaimer, the term of this patent is extended or adjusted under 35 U.S.C. 154(b) by 257 days.

(21) Appl. No.: 14/711,582

(22) Filed: May 13, 2015

(65) Prior Publication Data

US 2016/0334274 A1    Nov. 17, 2016

(51) Int. Cl.
| | |
|---|---|
| G01J 3/42 | (2006.01) |
| G01J 3/02 | (2006.01) |
| G01J 3/10 | (2006.01) |
| G01J 3/28 | (2006.01) |

(52) U.S. Cl.
CPC .............. *G01J 3/0254* (2013.01); *G01J 3/10* (2013.01); *G01J 3/28* (2013.01); *G01J 2003/2866* (2013.01)

(58) Field of Classification Search
CPC .... G01J 3/0254; G01J 3/10; G01J 3/28; G01J 2003/2866
USPC .......................................................... 356/319
See application file for complete search history.

(56) References Cited

U.S. PATENT DOCUMENTS

| | | | |
|---|---|---|---|
| 7,235,773 B1 * | 6/2007 | Newman ................ | H04N 5/361 250/214 C |
| 2006/0203483 A1 * | 9/2006 | Rains, Jr. ................. | F21S 2/00 362/231 |
| 2006/0280360 A1 * | 12/2006 | Holub ....................... | G01J 3/02 382/162 |
| 2009/0063081 A1 * | 3/2009 | Xu .......................... | G01D 3/022 702/107 |

* cited by examiner

*Primary Examiner* — Hina F Ayub
(74) *Attorney, Agent, or Firm* — Leason Ellis LLP (57) ABSTRACT

In accordance with a broad aspect of the present invention the system and method described are directed to correcting with a single reference channel thermally dependent spectrum shifts of a light source used with a spectrophotometer. In one embodiment of the system and method described, a light measuring device uses the measured light intensity values to generate a correction coefficient for use in correcting measured light from an object under analysis.

20 Claims, 7 Drawing Sheets

Fig.4 Spectrum shift of LED source

Fig.5 Spectrometer reading and reference channel reading at different wavelengths follows a linear relationship.

Fig.6 Linear regression coefficient of sample channel – reference channel relation as a function of wavelength Fig.7 Repeatability test result of a white tile with and without single braodband reference channel compensation.

SYSTEM AND METHOD FOR COMPENSATING LIGHT SOURCE DRIFT AT DIFFERENT WAVELENGTHS WITH A SINGLE REFERENCE CHANNEL IN A LIGHT MEASURING DEVICE

FIELD OF THE INVENTION

The present invention relates to a system and method for monitoring and compensating the thermal based spectrum change of light sources used with light measurement devices having a single dimensional reference channel.

BACKGROUND OF THE INVENTION

Light emitting diodes are a widely used illumination source for obtaining accurate color measurements. However, thermal control presents a significant challenge to obtaining accurate measurement in LED-based measurement applications. Specifically, when an LED is activated for an extended time, thermal accumulation on the P-N junction will cause a spectrum change in the light emitted by the LED.

This problem is overcome in dual channel spectrophotometers through the use of a reference channel that monitors the intensity variation of the LED source at each wavelength, and thus the spectrum change of the LED is not a concern. For example, the Datacolor 45G spectrophotometer manufactured by Datacolor Inc. of Lawrenceville, N.J., uses multiple LEDs to generate spectrally-uniform illumination to provide accurate color measurement. However, these LEDs are thermally sensitive. Temperature build-up at LED P-N junctions causes a spectrum change in the emitted light. In order to compensate for this spectrum change the 45G uses a reference channel to monitor the intensity change at each wavelength. The cost of such a reference channel is usually high.

Therefore, what is needed is a simple, inexpensive way to monitor and compensate the spectrum change of LED light at each wavelength.

SUMMARY OF THE INVENTION

In accordance with a broad aspect of the present invention, the system and method described are directed to correcting, with a single reference channel, thermally dependent spectrum shifts of a light source used with a spectrophotometer.

In one embodiment of the system and method described, a light measuring device having a processor, a memory, a light source configured to emit broad-band light, a sample sensor configured to output a sample signal in response to light being incident upon the sensor, a reference sensor configured to output a reference signal in response to light being incident upon the reference sensor, and a calibration measurement application stored in the memory and executable by the processor, are used to correct the spectrum shift of the light source.

In one particular arrangement the processor executes instructions for carrying out a step of causing the broad-band light source to emit a flash of light. This flash is reflected off of both the calibration target, and a reference target and measured by a sample sensor and a reference sensor respectively. The sample sensor consists of an element such as a diffraction grating that splits the light incident on it from the sample into parts at a plurality of wavelengths, and measures the intensity at each of these wavelengths. The reference sensor consists of a single measuring element that measures a single number from reflection by the reference target (which is often the inside of the integrating sphere, for sphere-based spectrometers). This flash is repeated a plurality of times (typically 20), for each of which a full spectrum of measurements is obtained from the sample channel and one intensity value measurement is made from the reference channel. The above measurements from the sample and reference sensor, with the calibration target occupying the sample position, are fit using linear regression by a coefficient value that represents the relation between the measured value obtained by the reference sensor and the value at a given wavelength of the sample sensor. The coefficient, as a function of wavelength, allows the system described to overcome the problem of flash-to-flash variability of the light during pulses of flashes.

In order to measure the true spectral data of an object, a second measurement sequence is provided where light is reflected off of an object under analysis and measured by the sample sensor and the same light is reflected off of the reference target and measured by the reference sensor. These measurements, along with the coefficient of correction, are used with the following formula to obtain the true sample signal:

$$I_c(\lambda) = I(\lambda) + k(\lambda) * \left[\frac{I(\lambda)}{I_W(\lambda)}\right] * (T_1 - T_0)$$

where $I(\lambda)$ is the measured sample signal at wavelength $\lambda$ when the object is measured, $k(\lambda)$ is the generated coefficient at wavelength $\lambda$, $T_1$ is the measured reference channel signal when the object is measured, $T_0$ is the reference signal when the calibration target is measured, $I_W(\lambda)$ is the measured sample signal using the calibration target and where $I_c(\lambda)$ is the corrected sample signal. This corrected light measurement value is then output by the processor for use or storage.

BRIEF DESCRIPTION OF THE DRAWINGS

The foregoing and other features of the present invention will be more readily apparent from the following detailed description and drawings of an exemplary embodiment of the invention where.

DESCRIPTION OF CERTAIN ILLUSTRATIVE EMBODIMENTS OF THE INVENTION

By way of overview and introduction, the present invention concerns a system and method to achieve accurate measurement of the light reflective properties of objects under analysis. Specifically, the system and method of the present invention are configured to compensate for thermally dependent spectrum shifts in light sources used in color measurement devices.

According to one embodiment of the present invention, a system is described that provides a mechanism for monitoring the spectrum change of a light source with a single reference channel such that only one band intensity, rather than a whole spectrum, is needed to compensate for the spectrum change.

Figure 1:
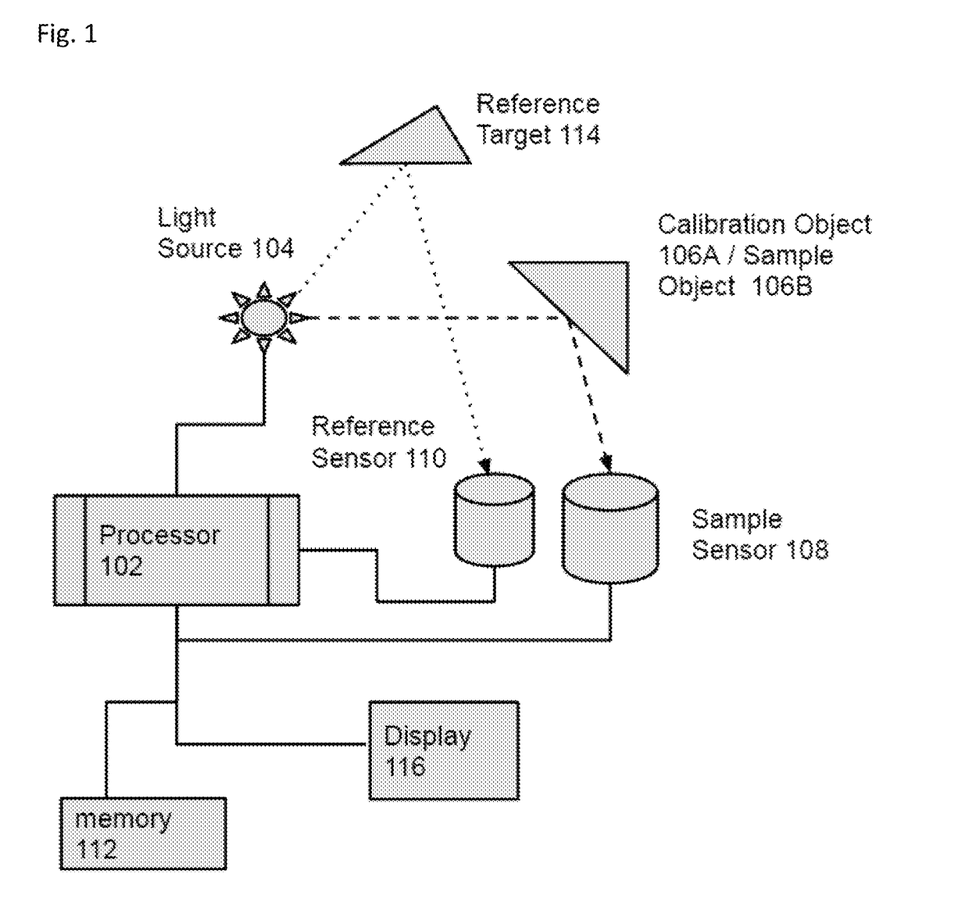
FIG. 1 is a schematic diagram detailing various components of an embodiment of the present invention.

With particular reference to FIG. 1, the system described includes a light source 104. The light source 104 in one embodiment is a light emitting diode (LED). In a further embodiment, the LED is a high color-rendering-index broadband LED. However, in an alternative configuration of the system described, the light source 104 is any light source that has thermally dependent spectrum shift.

Additionally, in one arrangement, the light source 104 is configured to emit a near constant-intensity, blackbody radiation spectrum between 300 and 800 nm. Additionally, the light source is configured to emit light in a series or sequence of flashes or pulses at the same or different wavelengths.

In an aspect of the system described, the light emitted by the light source 104, in a particular arrangement, is reflected off of a calibration object 106A and directed to the sample sensor 108. The calibration object 106A is in one arrangement a white tile calibration target commonly used with spectrophotometers. In another configuration the calibration object is a non-white, and/or non-uniform color tile used to calibrate the system.

In another aspect of the system, the light is reflected off of a sample object 106B and directed to the sample sensor 108. In this configuration, the sample object 106B is any object that is under analysis by the system.

The sample sensor 108 is in one embodiment a color sensor configured to output a signal in response to light incident on a photoreceptive element incorporated into the sensor. In a particular arrangement, the sample sensor is configured with wavelength separation elements, such as a diffraction grating, designed to split the light incident on the sensor into a plurality of wavelengths and measure the intensity of the light at each wavelength. In an alternative arrangement, the sample sensor 108 is a color sensor device utilized to output a signal corresponding to the wavelength, intensity, or other parts and components of the light incident upon the sample sensor 108.

The light from the light source 104 is also monitored by a reference sensor 110. Light from the light source 104 is reflected off of a reference object 114 and incident upon the reference sensor 110. In one arrangement, the reference object 114 is the interior surface of an integrating sphere equipped with a diffuse white reflecting coating. In one arrangement, the light incident on the reference sensor 110 is received from a plurality of different points on the integrating sphere.

The reference sensor 110 consists of a single measuring element that measures a single intensity value relating to the light reflected by the reference target (which in one arrangement is the inside of the integrating sphere, for sphere-based spectrometers). In a particular context, the reference sensor is a sensor configured to output a voltage that is related to the light intensity (irradiance) of the light incident on an incorporated photodiode element. In a particular embodiment, the reference sensor 110 is a multi-channel sensor where only a single channel is utilized.

The processor 102 is used to receive the signals output by the reference 110 and sample 108 sensors. In a particular arrangement, the processor 102 is configured to collect or store the output of the reference 110 and sample 108 in the memory 112 of the processor 102. These stored signals are used by the processor 102 to determine the relationship between the light intensity measured by the reference sensor 110 and the light intensity of the plurality of wavelengths measured by the sample sensor 108 during each flash or activation of the light source 104. The processor 102 is configurable by code stored within the memory 112 and is able to execute instructions and process data.

The memory 112 in a particular arrangement is removable storage device. In an alternative arrangement, the memory is non-removable data storage device. In another arrangement, the memory is a remote, network accessible storage, or cloud based storage device.

For example, the processor 102 is a general purpose microprocessor configured to execute instruction in the form of software applications. The processor 102 of the present embodiment is a desktop, notebook or tablet computer equipped with standard connections to the display device 116. In one non-limiting embodiment, the processor 102 is configured with inputs, such as USB, FIREWIRE, eSATA, or other direct data connections. As understood herein, the functions of the processor 102 are controlled by an operating system that is compatible or operable with commercially available software packages.

Figure 2:
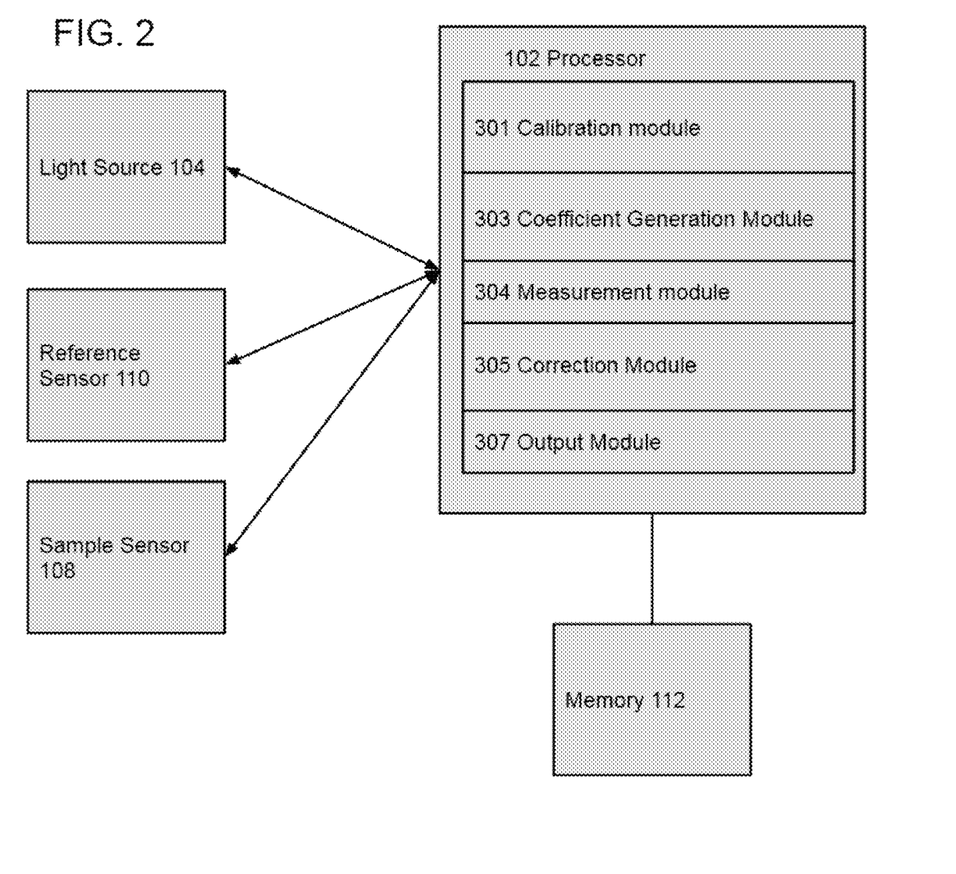
FIG. 2 is a block diagram of an exemplary system in accordance with an embodiment of the present invention.
Figure 3:
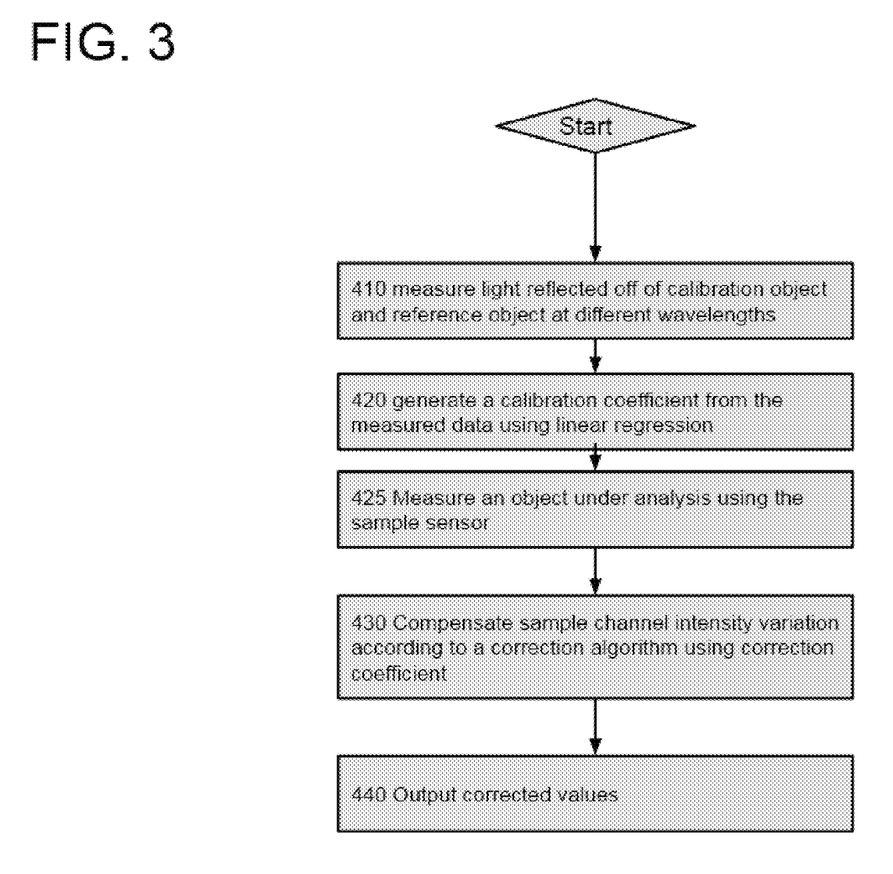
FIG. 3 is a flow diagram detailing the steps of an embodiment of a method described herein.

Turning to FIGS. 2 and 3, a series of programmed steps performed by a properly configured system using one or more modules of computer-executable code can be used to implement the tasks of the processor 102. For instance, a set of software modules can cooperate with one another to configure the processor 102 so that when executed, they provide an analysis of the light recorded as outputs from the reference sensor 110 and the sample sensor 108.

In a particular embodiment, the processor 102 is configured by a calibration module 301 to obtain from the sample sensor 108 a plurality of full spectrum measurements of the light emitted from the light source 104 and reflected off of the calibration object 106A (i.e. a white calibration tile). The calibration module also obtains an intensity measurement from the reference 110 sensor, corresponding to the same light reflected off of the reference object 114. In a further arrangement, the continuous measurements are obtained at specific timing internals. In a particular example shown in calibration step 410 of FIG. 3, 20 continuous measurements are obtained from the sample and reference sensors at two (2) second intervals between measurements. These continuous measurements are stored in a local or remote memory location for further use and access. In one arrangement, the measurements are transmitted to a remote data storage location along with additional information about the sample and reference sensors.

Figure 5:
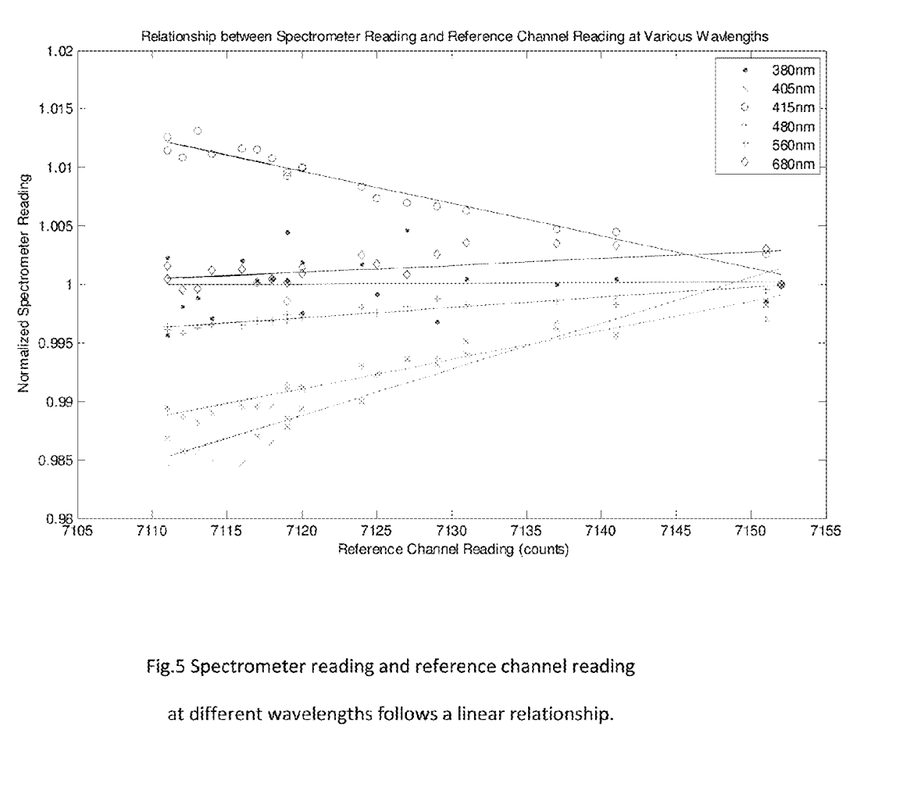
FIG. 5 is a chart of data points used to generate a calibration coefficient according to one aspect of the system and method.
Figure 6:
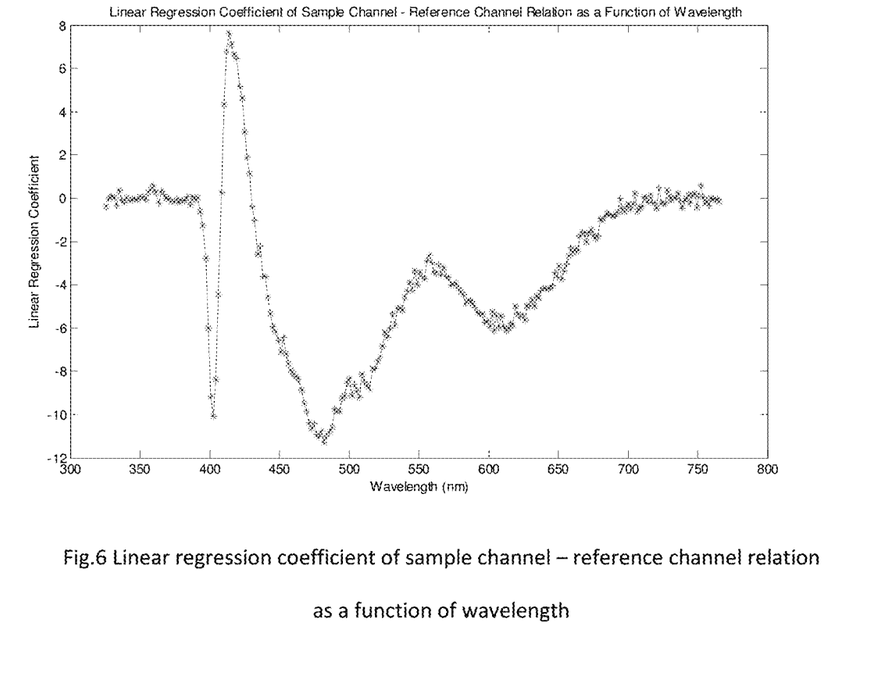
FIG. 6 is a chart of the linear regression coefficient of the sample channel according to one aspect of the system and method.

The processor 102 is configured by a coefficient generation module 303 to generate a coefficient value representing the relationship between the measured value obtained by the reference sensor 114 and the intensity of light at each wavelength measured by sample sensor 108 across the plurality of flashes. In one particular example, the relationship between the sample sensor 108 and the reference sensor 110 measurements is linear, as shown in FIG. 5. Thus, according to step 420, the processor 102 is configured by the coefficient generation module 310 to implement linear curve fitting to deduce from the direct or stored measurements, a linear regression coefficient value at each wavelength. In one context, the linear regression coefficient obtained from the dataset of FIG. 5 (i.e. the slope of the linear curve fitting) can be expressed as a function of the wavelength as shown in FIG. 6. In an alternative arrangement, a different (e.g. nonlinear) algorithm is used to generate the coefficient. The coefficient value is also stored in a local or remote memory storage device for later use. In a further configuration, a plurality of coefficient values, each representing a coefficient value obtained at different points in time, are used to generate a composite coefficient value.

The wavelength-dependent coefficient value obtained in step 420 is then used to compensate future measurements of any object under analysis such that the flash to flash variance in measurements attributable to thermally dependent shift is corrected.

The processor is further configured with a measurement module 304 to implement a measurement step 425 to measure the color properties of an object. In one arrangement, a calibration measurement is taken using a calibration tile. This measurement step 425 includes first obtaining a calibration measurement $I_W(\lambda)$ using a white tile as a calibration target and a reference target measurement $T_0$ using the reference target. In an alternative arrangement one or more measurement values used to generate the calibration coefficient are used to obtain $I_W(\lambda)$ and $T_0$. In this context, selected values obtained from the coefficient generation step are used as $I_W(\lambda)$ and $T_0$. In an alternative arrangement, the coefficient measurements are averaged and the resulting values are used as $I_W(\lambda)$ and $T_0$.

Once the calibration values are obtained, either by undertaking a new calibration measurement, or accessing stored values taken during the coefficient generation steps, a sample measurement is taken using light reflected off of the object 106B under analysis. This object can be any object with reflective properties suitable for analysis. Furthermore, during this measurement, the same broad-band light is also reflected of the reference target 114 (i.e. the interior of an integrating sphere) and measured by the reference sensor 110 to provide a measurement value $T_1$.

To obtain an accurate measurement of the color properties of a sample 106B with true spectral data, the measured values from step 425 are used to correct for the flash variability of the light source 104. The light intensity correction module 305 configures the processor 102 to implement a correction step 430 to correct the light measured by the sample sensor 108. Here, the correction coefficient value generated according to step 420 is used as an input to correction module 305.

In one arrangement, the correction module 305 uses the coefficient value $k(\lambda)$ to adjust the light measurement obtained in step 425 in order to compensate the intensity change of any wavelength ($\lambda$) measured by the sample sensor according to the following algorithm:

$$I_c(\lambda) = I(\lambda) + k(\lambda) * (T_1 - T_0) \tag{1}$$

In this equation, $I(\lambda)$ is the measured sample channel intensity at wavelength $\lambda$ when the object is measured, $k(\lambda)$ is the calibration coefficient at wavelength $\lambda$, $T_1$ is the measured reference channel intensity, $T_0$ is the measured reference channel intensity obtained from the reference sensor when the light from the light source has been incident on a white calibration tile. Here, $I_c(\lambda)$ is the compensated sample channel intensity value.

As pointed out in step 420, the calibration coefficient value k can in one arrangement, be obtained from a linear regression of the sample channel measurements of broad band light reflected off of a calibration tile 106A and the reference channel intensity measurement of the same broad band light. Therefore, once the calibration coefficient value k is obtained in step 420, it is used to adjust the values obtained by the sample sensor in step 430.

Figure 4:
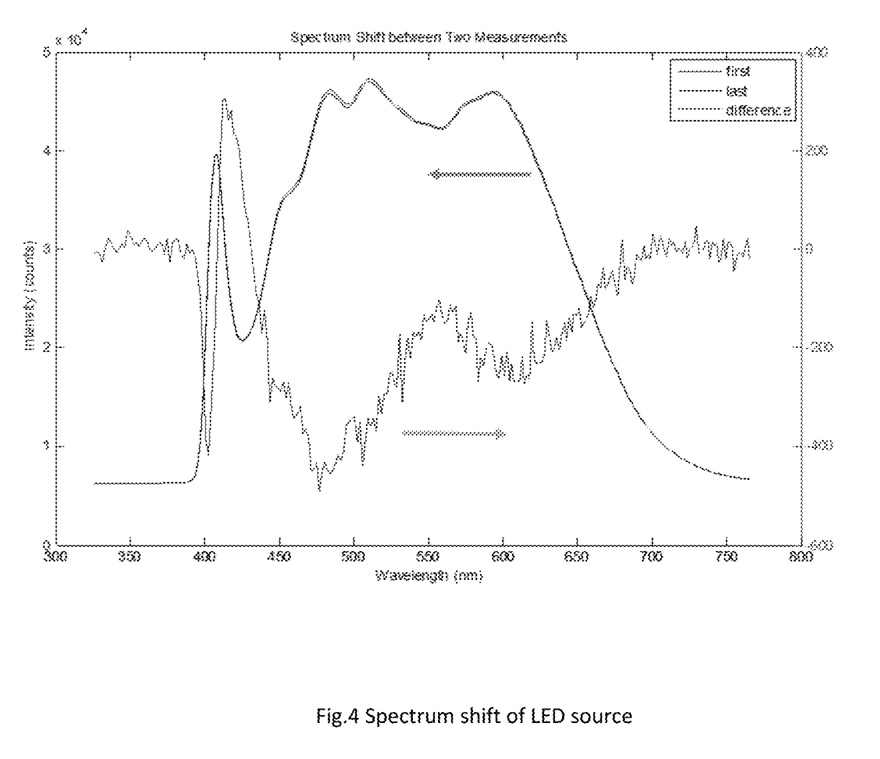
FIG. 4 is a chart of the spectrum shift of the light source according to the present invention.

As shown in FIG. 4, the amount of spectral change across the wavelength range is only about one (1) percent of the spectrum itself. This allows for the use of an approximation for the change in reflected light for a color sample. Specifically, for any color sample other than the calibration white tile, the compensation amount is, in one arrangement, proportional to the reflectance of the sample relative to that of the calibration white tile. Therefore, in a further arrangement, the correction module 305 utilizes the following algorithm:

$$I_c(\lambda) = I(\lambda) + k(\lambda) * \left[\frac{I(\lambda)}{I_W(\lambda)}\right] * (T_1 - T_0), \tag{2}$$

In this example, $R(\lambda)/R_W(\lambda) \approx I(\lambda)/I_W(\lambda)$, where W is for the white calibration tile. In a particular arrangement, $I(\lambda)$ and $I_W(\lambda)$ are measured from two different measurement periods (e.g. one for the calibration tile, and one for the object under analysis). However, the reflected-light ratio of the object under analysis and the calibration target 106 will likely not be significantly different. This assumption is justified by the magnitude of spectral change documented in FIG. 4.

This corrected sample measurement value is output by an output module 307 that configures the processor to implement an output step 440 to display the corrected value on a display device, or to store the corrected value to a database or storage device (not shown).

According to a further implementation, the output module 307 configures the processor to output an inferred reflectance $R(\lambda)$ value of a test sample based on the derived $I_C(\lambda)$, according to the following equation:

$$R(\lambda) = I_C(\lambda) R_W(\lambda) / I_W(\lambda) \tag{3}$$

This inferred reflectance value is then output to a display device or to a storage location along with the other output values.

Figure 7:
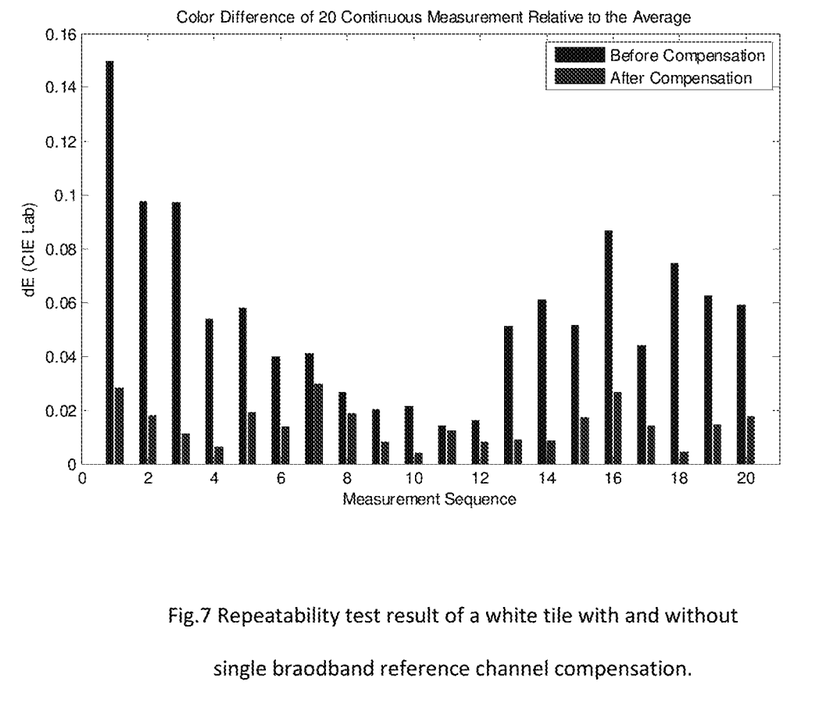
FIG. 7 is a chart of the calibration results utilizing the method and system described relative to other systems.

FIG. 7 provides the results of the described system and method in providing a smaller difference in measured values across the measurement sequence relative to measurements not employing the present invention. Specifically, FIG. 7 provides confirmation that the system and method of the present invention provide an improved mechanism for correcting for thermally dependent spectrum drift of the light source used in light measuring devices. More importantly, the results of FIG. 7 demonstrate the improved repeatability of the results using a single broadband reference channel according to the described system and method.

Those possessing the requisite level of skill in the art will appreciate that different sensors, (e.g. spectrophotometer units) may have different coefficients k, depending on the light source, system structure, ambient temperature, and other factors. Thus, the system and method described obtain specific calibration coefficients for the specific hardware and environmental conditions found during the measurement of objects under analysis. As such, the calibration coefficient is better suited than a generic, previously derived, calibration value for providing the optimal correction of measured values from the sample sensor 108. Therefore, in one arrangement, a previously calibrated device can access the coefficient value $k(\lambda)$ and use that value without needing to obtain the plurality of flash measurements necessary to obtain the coefficient correction value.

The present invention also incorporates a method of using the system described to carry out and achieve the function of generating a calibration coefficient for use in compensating the spectrum shift of a light source used with a color measurement device. Such a method involves, measuring the light incident off a calibration target with a sample sensor configured to output a sample signal, measuring the light incident off a reference target with a reference sensor configured to output a reference signal, and a calibration measurement application stored in the memory, executable by the processor and is used to correct the spectrum shift of a light source using a single reference channel.

In a further step, each light flash is reflected off of a calibration target prior to being incident on the sample sensor. The processor records the intensity values at each wavelength of light emitted by a broad-band light emitting device using a sample sensor across the plurality of light flashes. Contemporaneously, a reference sensor measures the intensity of the broad band light flashes reflected off of a reference target (e.g. the inside of an integrating sphere). The method also includes transforming the measured signals from these plurality of flashes into a compensation coefficient based on the relationship between the signal sensor measurement values and the reference sensor measurement value at each wavelength. Additionally, the method includes measuring the light qualities of an object under analysis. Once the measurements of the light qualities of an object are obtained, the measured values are corrected or compensated by applying the reference formula $$I_c(\lambda) = I(\lambda) + k(\lambda) * \left[\frac{I(\lambda)}{I_W(\lambda)}\right] * (T_1 - T_0).$$

Here, $I_W(\lambda)$ and $T_0$ are obtained either from one of the measurements taken during the coefficient calibration generation step, or represent an average, weighted, or composite value of two or more of the values obtained during the coefficient generation step.

Each of the forgoing steps can be configured as a series of discrete modules or sub-modules designed to access and control the light source device, the reference and sample sensors, memory devices and output devices. Each of these modules can comprise hardware, code executing in a processor, or both, that configures a machine, such as the computing system, to implement the functionality described herein. The functionality of these modules can be combined or further separated, as understood by persons of ordinary skill in the art, in analogous implementations of embodiments of the invention.

Various embodiments of the systems and techniques described here can be realized in digital electronic circuitry, integrated circuitry, specially designed ASICs (application specific integrated circuits), computer hardware, firmware, software, and/or combinations thereof. These various embodiments can include embodiment in one or more computer programs that are executable and/or interpretable on a programmable system including at least one programmable processor, such as processor 102, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable storage medium and computer-readable storage medium refer to any non-transitory computer program product, apparatus and/or device (e.g., magnetic discs, optical disks, memory, Programmable Logic Devices (PLDs)) used to provide machine instructions and/or data to a programmable processor, including a machine-readable storage medium that receives machine instructions as a machine-readable signal. The term machine-readable signal refers to any signal used to provide machine instructions and/or data to a programmable processor. A non-transitory machine-readable storage medium does not include a transitory machine-readable signal.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, touchscreen or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an embodiment of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

It should be understood that various combinations, alternatives and modifications of the present invention could be devised by those skilled in the art. The present invention is intended to embrace all such alternatives, modifications and variances that fall within the scope of the appended claims.

While the invention has been particularly shown and described with reference to a preferred embodiment thereof, it will be understood by those skilled in the art that various changes in form and details may be made therein without departing from the spirit and scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Particular embodiments of the subject matter of the present invention have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above-description of embodiments of the present invention are not intended to be exhaustive or to limit the systems and methods described to the precise form disclosed. While specific embodiments of, and examples for, the apparatus are described herein for illustrative purposes, various equivalent modifications are possible within the scope of other articles and methods, as those skilled in the relevant art will recognize. The teachings of articles and methods provided herein can be applied to other devices and arrangements, not only for the apparatus and methods described above.

The elements and acts of the various embodiments described above can be combined to provide further embodiments. These and other changes can be made to the apparatus and methods in light of the above detailed description.

What is claimed:

1. A computer implemented method to compensate temperature induced light source drift in a spectrophotometer using a light measuring device having a processor, a memory, a light source configured to emit broad band light, a sample sensor configured to output a sample signal in response to light being incident upon the sensor, a reference sensor configured to output a reference signal in response to light being incident upon the reference sensor, and a calibration measurement application stored in the memory and executable by the processor, the method comprising the steps of:

emitting a plurality of flashes of light from the light source such that the light is incident on a reference target and a calibration target, measuring, for each of the plurality of light flashes, the intensity of each wavelength of the light reflected off a calibration target using the sample sensor, and the intensity of the light reflected off a reference target using the reference sensor;

transforming the measured values into a compensation coefficient value based on the relationship between the sample sensor measurement and the reference sensor measurement at each wavelength;

obtaining a sample measurement of the intensity at different wavelengths of light reflected off of a sample under analysis with the sample sensor and a reference measurement of the intensity of light reflected off of the reference target;

generating a corrected sample measurement according to a compensation algorithm that incorporates the compensation coefficient; and outputting the corrected sample signal.

2. The method of claim 1, wherein the compensation algorithm is:

$$I_c(\lambda) = I(\lambda) + k(\lambda) * \left[\frac{I(\lambda)}{I_W(\lambda)}\right] * (T_1 - T_0)$$

where $I(\lambda)$ is the measured sample signal at wavelength $\lambda$ when the object is obtained, $k(\lambda)$ is the transformed coefficient value at wavelength $\lambda$, $T_1$ is the measured reference channel signal when the object is measured, $T_0$ is a measured reference signal value obtained during the measuring step, $I_W(\lambda)$ is a measured sample signal value obtained during the measuring step and where $I_c(\lambda)$ is the corrected sample signal.

3. The method of claim 2, wherein $I_W(\lambda)$ and $T_0$ are derived from the measurements obtained in the measuring step.

4. The method of claim 2, wherein $I_W(\lambda)$ and $T_0$ are selected from among the values obtained in the measuring step.

5. The method of claim 2, further comprising the step of:
generating a reflectance $R(\lambda)$ value of the object based on $I_C(\lambda)$, according to the following:

$$R(\lambda)=I_C(\lambda)R_W(\lambda)/I_W(\lambda).$$

6. The method of claim 1, wherein the transforming step includes performing a linear regression on the sample and reference signals at each wavelength to generate the compensation coefficient.

7. The method of claim 1, where the light source is an LED.

8. The method of claim 1, where the sample sensor is a spectrophotometer.

9. The method of claim 1, where the light source is subject to thermally dependent spectrum shift.

10. The method of claim 1, wherein the reference sensor is selected from a broadband sensor, a narrowband sensor, a single band sensor, or a multiband sensor.

11. The method of claim 1, wherein the reference target is part of the inside surface of an integrating sphere.

12. A system for compensating thermally dependent light source drift in a spectrophotometer, the system comprising:

a. a spectrophotometer having a processor, a memory, a light source configured to emit broad-band light, a sample sensor configured to output a sample signal in response to light being incident upon the sensor, a reference sensor configured to output a reference signal in response to light being incident upon the reference sensor, b. the processor of the spectrophotometer configured by code executing therein to implement the steps of:

emitting a plurality of flashes of light from the light source such that the light is incident on a reference target and a calibration target, measuring for each of the plurality of light flashes, the intensity at each wavelength of the light reflected off a calibration target using the sample sensor and the intensity of the light reflected off a reference target using the reference sensor;

transforming the measured values into a compensation coefficient based on the relationship between the signal channel measurement and the reference channel measurement at each wavelength;

obtaining a sample measurement of the intensity at different wavelengths of light reflected off of a sample under analysis with the sample sensor and a reference measurement of the intensity of light reflected off of the reference target;

generating a corrected sample signal according to:

$$I_c(\lambda) = I(\lambda) + k(\lambda) * \left[\frac{I(\lambda)}{I_W(\lambda)}\right] * (T_1 - T_0)$$

where $I(\lambda)$ is the measured sample signal at wavelength $\lambda$ when the object is measured, $k(\lambda)$ is the generated coefficient at wavelength $\lambda$, $T_1$ is the measured reference channel signal when the object is measured, $T_0$ is a reference signal value obtained from the measuring step, $I_W(\lambda)$ is a measured sample signal value obtained from the measuring step and where $I_c(\lambda)$ is the corrected sample signal; and outputting the corrected sample signal.

13. The method of claim 12, wherein $I_W(\lambda)$ and $T_0$ are the average values of the measurements obtained in the measuring step.

14. The method of claim 13, further comprising the step of:

generating a reflectance $R(\lambda)$ value of the object based on $I_C(\lambda)$, according to the following:

$R(\lambda)=I_C(\lambda)R_W(\lambda)/I_W(\lambda)$.

15. The method of claim 12, wherein $I_W(\lambda)$ and $T_0$ are selected from among the values obtained in the measuring step.

16. The method of claim 12, wherein the transforming step includes performing a linear regression on the sample and reference signals at each wavelength to generate the compensation coefficient.

17. The method of claim 12, where the light source is an LED.

18. The method of claim 12, wherein in the reference target is an integrating sphere.

19. A system for compensating thermally dependent light source drift in a spectrophotometer, the system comprising:

a. a spectrophotometer having a processor, a memory, a light source configured to emit broad-band light, a sample sensor configured to output a sample signal in response to light being incident upon the sensor, a reference sensor configured to output a reference signal in response to light being incident upon the reference sensor, b. the processor of the spectrophotometer configured by code executing therein to implement the steps of:

accessing a calibration coefficient from the memory;

obtaining a sample measurement of the intensity at different wavelengths of light reflected off of a sample under analysis with the sample sensor and a reference measurement of the intensity of light reflected off of the reference target;

generating a corrected sample signal according to:

$$I_c(\lambda) = I(\lambda) + k(\lambda) * \left[\frac{I(\lambda)}{I_W(\lambda)}\right] * (T_1 - T_0)$$

where $I(\lambda)$ is the measured sample signal at wavelength $\lambda$ when the object is measured, $k(\lambda)$ is the generated coefficient at wavelength $\lambda$, $T_1$ is the measured reference channel signal when the object is measured, $T_0$ is a reference signal value obtained from the measuring step, $I_W(\lambda)$ is a measured sample signal value obtained from the measuring step and where $I_c(\lambda)$ is the corrected sample signal; and outputting the corrected sample signal.

20. The system for compensating thermally dependent light source drift in a spectrophotometer of claim 19, wherein the calibration coefficient value stored in the memory is determined according to the steps of:

emitting a plurality of flashes of the light from the light source such that the light is incident on a reference target and a calibration target, measuring for each of the plurality of light flashes the intensity each wavelength of light reflected off a calibration target using the sample sensor the intensity of the light reflected off a reference target using the reference sensor;

transforming the measured values into a compensation coefficient based on the relationship between the signal channel measurement and the reference channel measurement at each wavelength.

* * * * *